United States Patent
Vau (10) Patent No.: US 7,253,579 B2
(45) Date of Patent: Aug. 7, 2007

(54) AUTOMATIC TUNING METHOD FOR THE FEEDBACK CONTROL OF A MOTION SIMULATOR, AND RELATED DEVICE

(75) Inventor: Bernard Vau, Rueil Malmaison (FR)

(73) Assignee: Societe Nouvelle Wuilfert, Limeil Brevannes (FR)

( * ) Notice: Subject to any disclaimer, the term of this patent is extended or adjusted under 35 U.S.C. 154(b) by 0 days.

(21) Appl. No.: 11/413,001

(22) Filed: Apr. 28, 2006

(65) Prior Publication Data

US 2006/0284588 A1 Dec. 21, 2006

(30) Foreign Application Priority Data

Jun. 10, 2005 (FR) .................................. 05 51576

(51) Int. Cl.
*G05B 19/18* (2006.01)
(52) U.S. Cl. .................. 318/569; 318/600; 318/568.1; 700/19; 700/23
(58) Field of Classification Search ............... 318/569, 318/567, 568.1, 600, 677; 700/19, 23, 29, 700/31
See application file for complete search history.

(56) References Cited

U.S. PATENT DOCUMENTS

| | | | | |
|---|---|---|---|---|
| 5,978,752 A | * | 11/1999 | Morris | ..................... 702/186 |
| 6,285,971 B1 | * | 9/2001 | Shah et al. | ..................... 703/2 |
| 6,381,505 B1 | * | 4/2002 | Kassmann et al. | ............ 700/44 |
| 6,445,963 B1 | * | 9/2002 | Blevins et al. | ................ 700/44 |
| 6,826,521 B1 | | 11/2004 | Hess et al. | |
| 2002/0111758 A1 | | 8/2002 | Wang et al. | |
| 2003/0028266 A1 | | 2/2003 | Jacques | |

OTHER PUBLICATIONS

Li et al., "Modeling, Simulation, and Control of a Hydraulic Stewart Platform," *Proceedings of the IEEE International Conference on Robotics and Automation*, Apr. 1997, pp. 3360-3366.

Chiacchio et al., "Robust Design of Independent Joint Controllers with Experimentation on a High-Speed Parallel Robot," *IEEE Transactions on Industrial Electronics*, Aug. 1993, vol. 40, No. 4, pp. 393-403.

* cited by examiner

*Primary Examiner*—Rina Duda
(74) *Attorney, Agent, or Firm*—Young & Thompson (57) ABSTRACT

A tuning method for a motion simulator embarking a payload. The simulator includes a mechanical device, a mobile plate of which is capable of carrying a payload, and a control unit including a controller capable of position feedback controlling said plate. The method enables an automatic tuning of the controller in order to feedback control the system embarking a given payload.

17 Claims, 4 Drawing Sheets

AUTOMATIC TUNING METHOD FOR THE FEEDBACK CONTROL OF A MOTION SIMULATOR, AND RELATED DEVICE

The invention relates to the feedback control of the motion of a motion simulator.

A motion simulator is an apparatus including a mechanical device and electronic and software units for the control of the mechanical device. Said device includes a mobile plate intended for receiving a payload. The plate is able to be moved in rotation around one or several geometric axis and/or in translation along one or several geometric axis. In a Cartesian reference frame, for example terrestrial, the position of the solid formed by the plate is given by the position of its centre of gravity and the orientation of an axis perpendicular to the plane of the plate.

A motion simulator may be an on-board positioner for positioning a given payload.

A motion simulator may also be a test bench for testing payloads, such as inertial systems, which are tested during a sequence of controlled motions. The plate is moved according to a predetermined sequence including a temporal succession of reference input positions. At each time, the position parameters of the plate may be compared with the cinematic parameters measured by the inertial system to be tested.

In order the plate to track accurately the reference input positions, it is compulsory to use a position feedback control loop of the plate.

Figure 1:
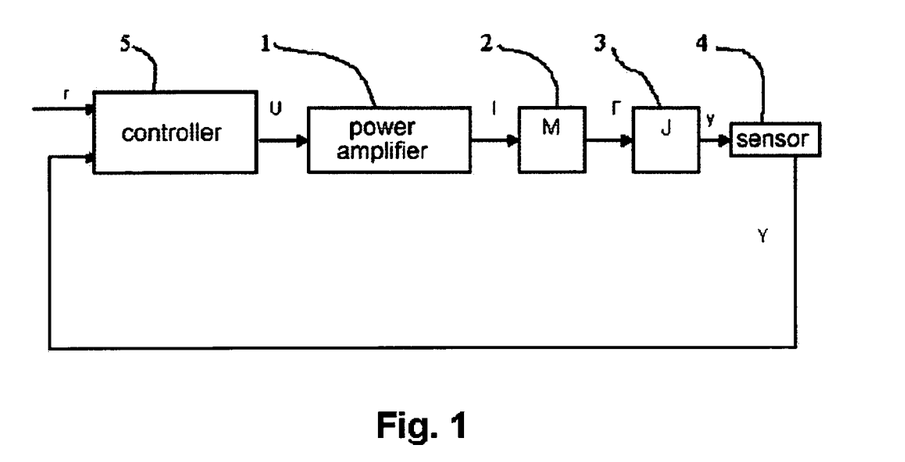
FIG. 1 is a general diagram of a feedback control loop of a motion simulator.

FIG. 1 shows a general diagram of a feedback control loop of a motion simulator around one rotation axis. The mechanical part of this feedback control loop comprises: the plate and its payload mounted on a mechanical axis, the mechanical system 3 thus formed having a moment of inertia J with respect to its axis of rotation; a motor 2; a power amplifier 1; and, a position sensor 4. In response to a control signal U, the power amplifier 1 outputs a current I, the amplitude and the phase of which enable to control the motion of the motor 2. The motor 2 generates a torque Γ enabling to put the mechanical system 3 in rotation. The sensor 4 measures continuously the actual position y of plate 3 and outputs a measuring signal providing a measurement Y of the position of plate 3.

Generally speaking, the feedback control of a rotating machine consists in creating a feedback from the measured value Y of a quantity y, such as position, speed, etc. The purpose of this feedback is to enable an effective tracking of the reference input r. A block of correction or controller 5 is generically defined as a component capable of transmitting a control signal U according to a reference input r and a measured value Y so that, for the given reference input r, the measured value Y converges towards this value of the reference input.

Figure 2:
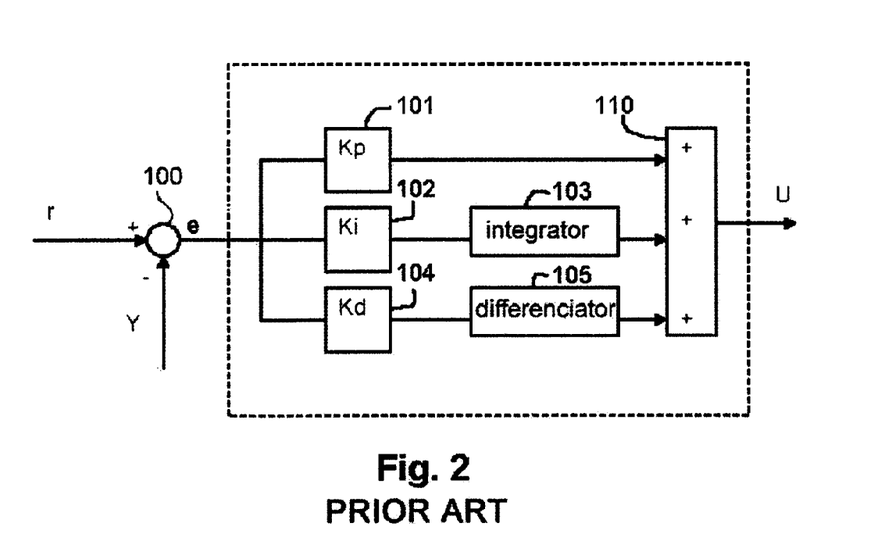
FIG. 2 is a general diagram of a PID controller according to the previous art for implementing the feedback control loop of FIG. 1.

According to the previous art, the most frequently used feedback controller is a controller of PID type (proportional, integral, derivative), the principle of which is described on FIG. 2. On this Figure, first of all, at step 100, the measured value Y is subtracted from the reference input r. A deviation e is provided at the output of step 100. At step 101, deviation e is multiplied by a constant $K_P$ and the obtained result is applied to the input of an adder 110. Meanwhile, at step 102, deviation e is multiplied by a constant $K_I$. Then, at step 103, the obtained result is integrated with respect to time. At the output of the step 103, the result is applied to the input of adder 110. Meanwhile, at step 104, deviation e is multiplied by a constant $K_D$ and then derived with respect to time during step 105. The result of step 105 is transmitted to the input of adder 110. Finally, adder 110 performs the addition of the different quantities which reach said adder. Adder 110 outputs the control signal U which is therefore of the form:

$$U = K_P e + \int K_I e \, dt + d(K_D e)/dt$$

Coefficients $K_P$, $K_I$, and $K_D$ are set so that deviation e tends to zero as quickly as possible when changing the value of reference input r.

Tow main concepts enable to characterise a feedback control loop:

Robustness: it means the insensitivity of the controller to uncertainties on the physical modelling of the system to be controlled. In such a case, the controller must be robust with respect to the variation of the moment of inertia of the mechanical system 3 when changing the payload. Indeed, since the purpose of a motion simulator is to test different payloads, the moment of inertia J of the mechanical system is inevitably modified when changing the payload. It is said that a controller is robust when it guarantees the stability of the closed control loop when one or several physical parameters of the machine to be regulated are varying. In the case of a motion simulator, this parameter is the moment of inertia. As a reminder, stability is a quality of the controlled system to behave so deviation e tends to a finite value when reference input r is modified. But, the convergence of deviation e can occur after a very long time. It the reason why it is also necessary to introduce the concept of performance to characterise a feedback control loop;

Performance: it means the dynamics of the tracking of reference input r and the dynamics of rejection of disturbances which may affect the system. For example, in the case of motion simulators, disturbances which may affect the system are generated by a braking torque caused by frictions which have not been taken into account.

From a theoretical viewpoint, it can be shown that the objectives of performance and of robustness are antagonistic. When high performances are requested, i.e. the system rejects disturbances very rapidly, this is achieved to the detriment of robustness.

For motion simulators, looking for of a maximum bandwidth leads to favour performance over robustness. In general, the robustness is relatively low, requiring the tuning of the controller for each payload.

Thus, the parameters of the used controller, for example gains $K_P$, $K_I$, and $K_D$ of the PID type controller of FIG. 2, must be tuned at each payload change.

According to the previous art, in the area of motion simulators, the tuning of the controller is performed manually by a technician responsible for the simulator each time the payload on the simulator is changed. This tuning is time-consuming and empirical. Indeed, it requires numerous tests of the trial-and-error type in order to find the value of the adapted gains since the tuning parameters of the PID controller are interdependent. It is moreover difficult to guarantee that the obtained tuning corresponds to the optimal tuning of the system. If the feedback control loop operates with a controller which has been set up wrongly, there is a risk that the closed loop will not be stable.

Methods for an automatic tuning of a controller are known from other technical fields distant from the one of motion simulators.

One method consists in performing, in real time, an automatic tuning of the parameters of the controller for the control of a rotating machine during its use. This method known as "self control" is not adaptable to motion simulators because it is of a great complexity, in particular due to the constraint of real time tuning of the controller. Moreover, a precise control of the motion is out of reach because the parameters of the controller are modified at each time. This arises especially at the beginning of the motion sequence, when the payload has just been changed and the implementation of the tuning method modifies continuously the gains.

Another method used in the field of rotating machines consists in performing an initial test step during which the controller is tuned. The automatic tuning of a controller is performed according to the following procedure:

Excitation of the system with a stimulus (change of the current applied to the motor);

Acquisition of the response of this system to the excitation;

Use of the data obtained to form a mathematical model of the system (in the form of a transfer function or a state space model); and, Use of the model obtained for the synthesis of the controller.

But, most of the time, the excitation step is carried out in an open loop, i.e. with no feedback. Thus, the user does not know beforehand the value of the acceleration, speed or position (deviation in position of the axis) of the motion.

For motion simulators, such a test is not possible in particular because, during the excitation step of the system, constraints such as maximum values of acceleration, speed and position must not be exceeded, or else the apparatus may be damaged. It is therefore compulsory that this test should be conducted in a controlled manner, i.e. with a feedback enabling to prevent the constraints from being violated.

Jouve and al. [Autotuning of axis control systems for robots and machine tools IEEE 1991] have suggested a method enabling to perform an initial test step including a closed loop test for a rotating machine which is a tool machine fitted with a speed sensor. Thus, this article disclosed a speed feedback control loop.

This solution is not applicable for motion simulators since they are provided with very precise position sensors, and rarely with speed sensors which are either expensive or noisy and not precise.

The use of a speed feedback control loop using a speed sensor will not enable to meet the constraints on the position of the motion during the test step. Indeed, the position will only be known apart from an integration constant. This uncertainty on the value of the integration constant implies that the point where the motion starts and/or finishes is not known, that can lead to the overshoot of limit stops and damage the motion simulator.

Besides, the Jouve et al. article discloses a method dedicated to machine tools. These machines work at high speed of the order of 5000 r/mn which is to be compared with the low speeds of around 500 r/mn of operation of motion simulators. And the described methodology can not be used at such low speeds, i.e. under a speed threshold, without the identification step being biased by nonlinear phenomenon.

Finaly, the Jouve and al. article implicitly discloses the use of a PI controller with low gains for the initial test step. For motion simulator, a too low gain can lead to an instable loop.

There is therefore a need for an automatic tuning method of a position feedback control loop dedicated to motion simulators. There is also a need that such an automatic tuning method enables to obtain rapidly the required performance/robustness compromise relative to a given payload.

To do so, the invention relates to tuning method to be implemented in a motion simulator able to embark a payload, said simulator including a mechanical device and a control unit, the mechanical device including driving means in order to move a plate capable of carrying the payload; a current amplifier capable of actuating the driving means in response to a control signal; a sensor capable of measuring a position of said plate; and said control unit including a controller capable of transmitting the control signal relative to a reference input signal and to said measured position.

The method according to the invention is characterised in that it enables an automatic tuning of said controller for a position feedback control of the motion of said plate embarking a given payload, said method including:

an initial step consisting in the synthesis of a robust controller, said synthesis being based on a first physical modelling of the mechanical device including one inertia parameter, said obtained robust controller enabling to control said mechanical device over a range of values of said inertia parameter extending between a minimum inertia parameter and a maximum inertia parameter; and, after having positioned said given payload on the plate;

a test step during which the mechanical device, controlled by means of said robust controller determined during the initial step is actuated according to a predefined position reference input profile complying with constraints on the acceleration, the speed and the position of the motion, said control signal and said measured position being stored continuously as data of the test step;

an identification step which, on the basis of the data of the test step, enables to determine the value of a plurality of physical parameters of a second modelling of the mechanical device embarking said given payload, said plurality of physical parameters including at least the inertia parameter; and, a final step consisting in the synthesis of an optimal controller adapted to said given payload, wherein the inertia parameter takes the value of the inertia parameter determined during the identification step Preferably, the mechanical device is able to translate said plate embarking a payload at least along one axis, the inertia parameter being then a mass of inertia.

Preferably, the mechanical device is able to rotate said plate embarking a payload at least around an axis, the inertia parameter being then a moment of inertia.

Preferably, during the initial step, the controller is in a closed feedback control loop on a digital simulation of the mechanical device embarking a payload having a nominal inertia parameter in said range.

Preferably, all the test, identification and final steps are carried out again at least each time the payload is changed.

Preferably, the first modelling is a linear modelling of the dynamic behaviour of the mechanical device.

Preferably, the robust and optimal controllers include a Kalman filter based on said first modelling, said Kalman filter taking, as input, the control signal, said measured position and said position reference input to generate, as output, an estimated state of said mechanical device, said estimated state being applied as a control signal after having been multiplied by a vector (state feedback vector).

Preferably, the Kalman filter enables to estimate the disturbances affecting said mechanical device by modelling them by a signal added to the control signal at the input of the mechanical device to be controlled.

Preferably, the synthesis of said robust and optimal controllers is preformed by means of a standard state control methodology ("méthodologie de contrôle de l'état standard" in French).

Preferably, the robust or optimal controllers include four high-level scalar tuning parameters.

Preferably, the initial step comprises first of all, while varying a first scalar parameter among the scalar parameters, looking for a controller having a modulus margin greater than a threshold modulus margin for all the values of the moment of inertia of the range of moment of inertia, and then, while varying another scalar parameter among the scalar parameters, so-called the second parameter, looking for a controller having a delay margin greater than a threshold delay margin for all the values of the moment of inertia of the range of moment of inertia.

Preferably, the value of the moment of inertia having been identified, said final step comprises first of all, while varying the second parameter, looking for a controller having a delay margin greater than said threshold delay margin, and then, while varying still another scalar parameter among said four scalar parameters, so-called the third parameter, looking for an optimal controller having a modulus margin greater than said threshold modulus margin.

Preferably, during the identification step, the second modelling is a linear modelling of the behaviour of the device.

Preferably, during the identification step, the second modelling takes into account explicitly the forces leading to a non linear behaviour of the device.

Preferably, the method includes, after completion of said test step, a pre-treatment step in order to reject the data for which the corresponding value of the speed of said plate is lower than a threshold speed.

In order to perform the excitation step with a position closed loop, it is necessary before this test to define a control law or a controller allowing to guaranty the stability of the motion simulator whatever the inertia of the payload set on the plate, stability being characterised with a finite response of the system to a variation of the reference input (no oscillation or divergence of the position relative to the reference input).

The use of a position feedback control with a position sensor allows to be sure to respect the space constraint of the plate and not to risk damaging the motion simulator. Accordingly, the invention is advantageously safe.

Moreover, the present invention is based on a modelling of the axis to be controlled. But, certain disturbing forces acting on the axis depend explicitly on the position (unbalancing mass), that necessitates the absolute knowledge of this position in order to develop a modelling of the axis.

The structure of the controller used according to the invention, together with the methodology for the synthesis depend on the particular putting into practice, i.e. the application to motion simulators.

In addition, when using a position feedback control, the synthesis of the robust controller is more complex. For example, the synthesis of a PI controller with a low gain, as the one implicitly disclosed in the Jouve and al. article, is not sufficient. Advantageously, the synthesis of the robust controller of the LQG-H2 type is performed by a so-called standard state control methodology.

Finally, the method according to the invention is particularly easy to use. It can be implemented by the final user of the motion simulator who needs no longer be a control engineer, specialist of the tuning of the feedback loop. For example, the final user has only to specify the delay and modulus margins and to start the automatic method for the synthesis of the optimal controller.

The invention also relates to a motion simulator capable of embarking a payload, said motion simulator including a mechanical device and a control unit, the simulator including a mobile plate capable of carrying said payload; driving means capable of putting the plate in motion according to at least one axis; a current amplifier capable of actuating the driving means in response to a control signal; a sensor capable of measuring a position of said plate; the control unit including a controller capable of transmitting the control signal relative to a reference input signal and said measured position, characterised in that the control unit is configured to implement one of the above tuning methods to obtain an optimal controller for a given payload.

In a first embodiment, the motion simulator is an on-board positioner, the given payload being a useful payload.

In a second embodiment the motion simulator is a test bench, the given payload being a payload to be tested.

The invention will be better understood and other objects, details, features and advantages thereof will appear more clearly in the following description of a particular embodiment of the invention that is only given for illustrative and not limitative purposes, with reference to the appended drawings. On these drawings:

The method according to the invention enables an automatic tuning of a feedback control loop of a motion simulator adapted to a new payload. More particularly, the method according to the invention enables to obtain rapidly, of the order of a minute, the optimal controller for the new payload, exhibiting the requested performances/robustness compromise. By automatic tuning is meant a tuning which does not require the intervention of a technician, and which may take place, for example, by means of a calculator capable of carrying out the different steps of the method according to the invention while executing the instructions of a software stored in suitable storage means.

Schematically, the method according to the invention enables the synthesis of controllers adapted to the problem. These controllers are tuned by means of a certain number of parameters. During the different steps of the method according to the invention, the values of these parameters are tuned in order to define a particular controller having the sought compromise during this step.

The initial step of the method according to the invention aims to lead to the determination of a robust controller for the mechanical system to be controlled. To do so, it is necessary to use a first physical modelling of the behaviour of the mechanical device.

This first modelling is a linear modelling of a system which corresponds to the mechanical section of the mechanical device operating in the feedback control loop. The axis of the motion simulator is controlled by a DC motor or a brushless type. This motor is itself controlled in current. While neglecting the electric dynamics of the windings of the motor, torque $\Gamma$ (measured in Nu) generated by the motor is proportional to the intensity I (in A) of the applied current: $\Gamma = Kt \cdot I$ The proportionality factor is called torque constant $K_t$.

The considered system obeys the fundamental law of dynamics:

$$\frac{d\Omega}{dt} = -\frac{f}{J} \cdot \Omega + \frac{K_t}{J} \cdot I$$

$$\frac{d\theta}{dt} = \Omega$$

Expression wherein J (in kg.m²/rad) is the moment of inertia of the system (and hence of the payload carried by the plate of the motion simulator); f (expressed in N.m/rad) is a viscous friction coefficient; $\Omega$ (in rad/s) is the speed of rotation of the plate; and, $\Theta$ (in rad) is the instantaneous position of the plate. It is common to try to express this modelling according to the states of the system to be controlled. Assuming x is the instantaneous state of the system; U=I the control signal applied to the mechanical system to be controlled; and, y=$\theta$ the position to be controlled, the above equations can be written in the form of a system of so-called state equations:

$$\dot{x} = \frac{dx}{dt} = A \cdot x + B \cdot U$$

$$y = C \cdot x$$

With $x = \begin{pmatrix} \Omega \\ \theta \end{pmatrix}$ and $A = \begin{pmatrix} -\frac{f}{J} & 0 \\ 1 & 0 \end{pmatrix}$, $B = \begin{pmatrix} \frac{Kt}{J} \\ 0 \end{pmatrix}$, and $C = (0 \ 1)$.

The controller according to the invention is for example based on a controller of LQG-H2 type, hereafter called LQG. The synthesis of such a controller is carried out for example using a standard state control methodology. This methodology is described, for example, in the book of M Philippe de Larminat entitled <<contrôle d'état standard>> (standard sate control) published in 2000 by HERMES. As a variation to the standard state control methodology, the robust pole placement methodology could be used. This methodology is described in the book of Philippe de Larminat entitled <<automatique: commande des systèmes linéaires>> (control science: control of linear systems) published by HERMES. The controller would then be of a polynomial shape and have an RST structure which is the most general shape of the controllers controlling systems having one command variable and one measured variable. It is also possible to implement the LQG controller in the RST form.

Figure 3:
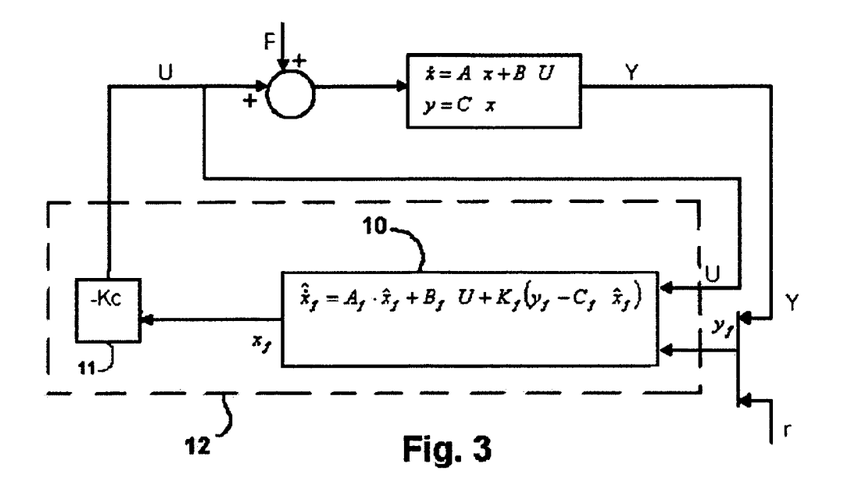
FIG. 3 is a block diagram representing the principle of the standard state control methodology by means of a controller integrating a Kalman filter and a feedback on an estimated state of the mechanical device, used in the method according to the invention.

As represented schematically on FIG. 3, this methodology uses a feedback control loop wherein the controller 12 includes a Kalman filter 10. The Kalman filter 10 takes, as input, the control signal U and the vector $y_f$ containing the measured value Y and the reference input r. Vector $\hat{x}_f$, corresponding to the estimated state of the system by filter 10, is used as control signal U after having been multiplied by a line vector -Kc, called state feedback vector (block 11 on FIG. 3). The Kalman filter 10 enables, to a certain extent, to estimate the state of the system taking into account the modelling of the system as well as input (U) and output (Y) quantities effectively applied to the mechanical device.

Advantageously, the set of the Kalman filter 10 and state feedback vector enables to reject the disturbances which may modify the behaviour of the system.

During the initial step, the feedback control loop is closed on a digital simulation of the actual system. This digital simulation is also based on the above dynamic equations. The system having been simulated by linear equations, the disturbing torques are simulated by introducing a disturbance F applied to the input of the system. Then, estimate state vector $\hat{x}_f$ of the system possesses a component which is an estimate of the disturbance F.

Matrices Kc and Kf of the Kalman filter 10 are calculated so that the feedback control loop brings the system towards stability.

Les parameters enabling to tune the controller obtained according to the standard state control methodology are matrix Kf and the line vector Kc, the synthesis of which is made by minimising a quadratic criterion.

Advantageously, the controller is expressed not by means of parameters Kf and Kc, called low level parameters, but by means of the four following scalar parameters, called high level parameters:

A first parameter To is an essential parameter, which enables to manage a compromise between the choice of a high frequency disturbance rejection and a high delay margin;

A second parameter Tc enables to act as a referee of the compromise between the modulus margin and the excitation of the control;

A third parameter Tr enables to tune the dynamic tracking of the reference input;

A fourth parameter Ko is a form factor enabling to reinforce the robustness of the feedback control loop (to the detriment of the rejection dynamic).

Such a controller enables to select easily the compromises which occur inevitably in any synthesis technique of a particular controller. A PID controller does not provide such a possibility, since each tuning action of one of the constants $K_I$, $K_D$ or $K_P$ is coupled with the other two. An initial step of the method according to the invention is performed in factory when manufacturing the motion simulator. This initial step enables to determine the parameters of the controller which is robust relative to the variations of moment of inertia of the axis to be controlled. More precisely, the initial step leads to a controller guaranteeing the stability of the axis for a whole range of possible moments of inertia between a minimum moment of inertia Jmin, corresponding to the moment of inertia of the axis with no payload, and a maximum moment of inertia Jmax corresponding to the moment of inertia of the axis for a maximum payload. The ratio of the maximum moment of inertia Jmax and the minimum moment of inertia Jmin may, for example, reach a factor 10. The maximum Jmax and minimum Jmin moments of inertia may be calculated when designing the motion simulator, for example by means of conventionally used CAD software.

The nominal moment of inertia Jnom chosen for the synthesis of a robust controller by means of the standard state control methodology is such that:

$$Jnom = \sqrt{Jmin \cdot jmax}$$

The viscous friction f which appears in the physical modelling can not be known by calculation easily. It is the reason why the zero value is affected to the value of the viscous friction coefficient f. It should be noted that this case corresponds to the most detrimental case, because a dissipative phenomenon has globally stabilising effects.

The so-called nominal modelling used for the synthesis of the robust controller is thus reduced to the state equations:

$$\frac{d\Omega}{dt} = \frac{K}{J} \cdot U$$

$$\frac{d\theta}{dt} = \Omega$$

This state equation may be enriched with the current loop dynamics (containing among other things the current amplifier) in order to perfect the modelling and the performance of the controller.

Figure 4:
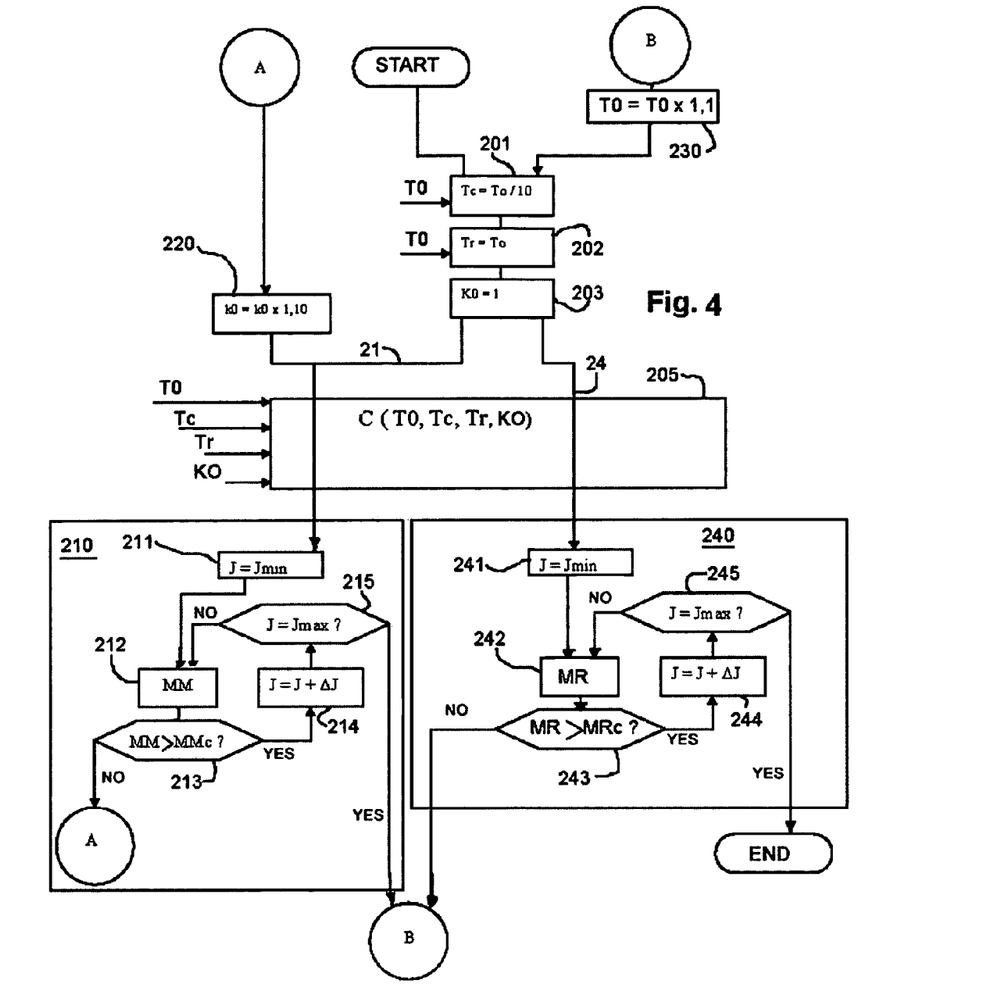
FIG. 4 is a diagram representing, in the form of an algorithm, the initial step of the method according to the invention enabling to obtain a robust controller with respect to the parameters of the system to be controlled.

In these expressions, K is a global amplification coefficient. K may be known by calculation assuming that the torque constant of the motor and the gain of the amplifier are known by design. The purpose of the synthesis during the initial step is then to find a robust controller which guarantees a correct level of static margin and a correct level of dynamic margin, regardless of the payload on the axis. Algorithm 200 of FIG. 4 represents the succession of elementary steps leading to the determination of a robust controller.

At the beginning of algorithm 200, the value of parameter To is taken arbitrarily low. At step 201, the value of parameter Tc is taken equal to the value of To divided by a factor for example equal to 10. At step 202, the value of parameter Tr is taken equal to the value of To. At step 203, the unit value is allocated to parameter Ko. Generally speaking, the simulator has an electronic unit including storage means and calculation means. The instructions of a software able of implementing in all or in part the method according to the invention are stored in the storage means. The instant values of the variables used are stored in a memory space, the address of which is predefined, and read from this memory space when the calculation means carry out an instruction performing an operation using this variable.

Then algorithm 200 goes on according to the direction indicated by line 21. Taking into account the value of each of the parameters To, Tc, Tr and Ko, a controller C is calculated at step 205 with the standard state control methodology The execution of the programme continues with loop 210. Loop 210 forms a first portion of algorithm 200 during which controller C is sought which provides a modulus margin MM greater than a threshold modulus margin MMc for all the configurations of the system, i.e. for all the values of the moment of inertia J between Jmin and Jmax. The value of the threshold modulus margin MMc has a predefined value, for example equal to 0.5.

Loop 210 runs iteratively as follows: at step 211, the value of the moment of inertia J takes the minimum value Jmin. At step 212, the modulus margin MM of controller C determined at step 205 is calculated taking into account this value of the moment of inertia J. At the output of step 212, corresponding to step 213, the value of the modulus margin MM is compared with the threshold modulus margin MMc.

If the modulus margin MM of controller C is lower than MMc, the programme 200 is oriented in A, towards the 220 as described below. Conversely, if for the value of the moment of inertia J, the modulus margin MM is greater than the threshold modulus margin MMc, then the value of the moment of inertia is incremented by a predefined value Δj, at step 214. At step 215, the new value of the moment of inertia J is compared with the maximum value Jmax. If J is smaller than Jmax, the modulus margin MM of controller C is calculated again, taking into account the new value of the moment of inertia J by running again step 212. The loop 210 takes place as long as J is smaller than the upper limit of the range of moment of inertia considered as relevant. As soon as J is equal to Jmax, B is the exit point of loop 210.

If, at step 213, the modulus margin MM is lower than the threshold modulus margin MMc, a new controller C must be built. To do so, at step 220, the actual value of parameter Ko is multiplied by a factor greater than the unit, for example 1.1. Then, a new controller C is determined at step 205. The execution of the software falls back in loop 210 to check whether this new controller C meets condition 213 for all the values of the moment of inertia J between Jmin and Jmax. As soon as such a controller C has been found, the software 200 switches to a second portion of the algorithm 200 (point B).

In a second portion of the initial step, a controller is sought ensuring a delay margin MR greater than a threshold delay margin MRc for all the configurations of the system, i.e. for all the values of the moment of inertia J between Jmin and Jmax. The value of the threshold delay margin MRc is predefined.

According to this second portion of algorithm 200, at step 230, the current value of parameter To is multiplied by a constant greater than the unit, for example 1,1. Taking into account this new value of parameter To, steps 201, 202 and 203 are carried out again to determine the value of the different parameters which will be used at step 205 to determine a new controller C; Ko keeps its previous value, it is not re-allocated at this step. Schematically, algorithm 200 follows the line indicated by reference numeral 24. Upon completion of step 205, the algorithm 200 falls in a loop 240. Loop 240 is similar to loop 210 except that it enables to calculate the delay margin MR and to compare it with the value of the threshold delay margin MRc and this for all the values of the moment of inertia J between the minimum value Jmin and the maximum value Jmax. At step 241, the minimum value Jmin is associated with the actual value of the moment of inertia J. At step 242, taking into account the controller C calculated at the previous step 205, the delay margin MR is calculated. At step 243, this value is compared with the threshold value MRc. If the delay margin MR is lower than the threshold value MRc, software 200 is oriented in B towards step 230. A new value of the parameter To is calculated, the other parameters of the controller are updated and a new controller C is determined before the algorithm comes back into loop 240.

If, at step 243, the delay margin MR is effectively greater than MRc, the actual value of the moment of inertia J is incremented by a predefined value Δj at step 244. Then, at step 245, the new value of the moment of inertia J is compared with the maximum value Jmax. If J differs from Jmax, the 242 is conducted again to calculate the new value of the delay margin MR. This loop is executed as long as, at step 245, the moment of inertia J is smaller than the maximum moment of inertia Jmax. But, as soon as J is equal to Jmax, algorithm 200 ends, the controller C thus calculated being a robust controller for the range of moments of inertia.

Incidentally, it can be demonstrated that the second portion of algorithm 200 does not significantly modify the modulus margins MM obtained in the first portion of the same algorithm.

Then, in situ, when using the motion simulator and each time a new payload has just been mounted on the plate, the method according to the invention continues by using parameters of the robust controller to define an optimal controller for the new payload. This method can be divided into three successive steps: a test step, an identification step, then a final step leading to the synthesis of the optimal controller.

Figure 5:
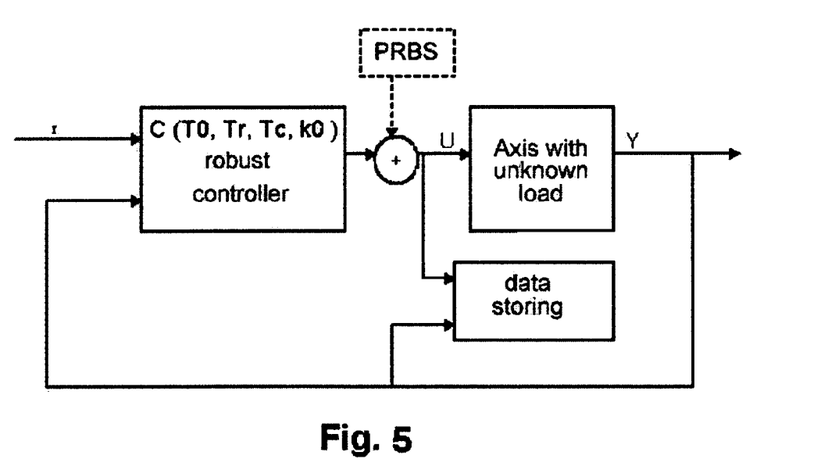
FIG. 5 represents schematically the feedback control loop in the test step of the method according to the invention.
Figure 6:
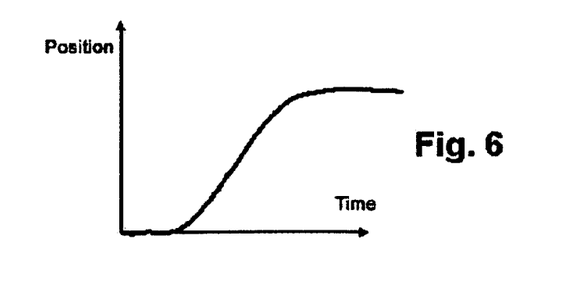
FIG. 6 is a graph representing the position corresponding to the reference input applied at the input of the controller of FIG. 5 during the test step.

During the test step, the configuration of FIG. 5 prevails. During this test, which is a closed loop test, a motion of the axis is controlled by the robust controller obtained upon completion of the initial step in order to characterise the unknown payload carried by the axis. This test consists in realising a motion of the axis following a predefined position reference input profile such the one represented schematically on FIG. 6. This position reference input profile is designed relative to the constraints in acceleration, speed and position which must not be exceeded so as not to damage the simulator. Other reference profiles are possible, it is nevertheless compulsory that the speed at which the test is conducted reaches a sufficiently significant level so that the non linear phenomenon at low speed does not occur.

For the control signal to be rich and exhibit as wide a spectrum as possible, a pseudo-random binary sequence (PRBS), indicated by a dotted line on FIG. 5, may be added to the signal corresponding to the reference input profile as an alternative. The amplitude of the pseudo-random binary sequence is calibrated so that said signal does not disturb the direction of rotation of the motion simulator and does not cause a violation of the constraints set to the acceleration, the speed and the position of the axis.

During this test step, the data which correspond to the input variables (values of the control signal U) and to the output variables (in this case, the measured position Y) are stored in relation to time.

The data stored are subjected to a pre-treatment in order to make them useful at the following identification step. For a given time t, this pre-treatment consists in deriving the position signal Y in order to extract an instant measurement of the speed of the axis. Then, if the measured speed is lower than a threshold speed value, then the pre-treatment consists in suppressing the control data U and the position data Y corresponding to that time t. Thus, the non-linear effects taking place at low speed, also called Stribeck effect, are not taken into account.

The method then includes an identification step of the system for a given payload. More precisely, this identification step enables to determine the value of the parameters of a second physical modelling of the system considered (inertia, frictions, etc.) by exploiting data recorded during the test step.

The second physical modelling of the system to be controlled should take into account the non-linearities affecting the system to be controlled. The dry frictions and/or the unbalancing mass may be modelled. The unbalancing mass is the lack of equilibrium of a mechanical part, relative to an axis which is not vertical, due to the fact that its centre of gravity is not on the axis of rotation. Thus, a non-linear modelling of the axis may be written as follows:

$$J \frac{d\Omega}{dt} = -f \cdot \Omega + \Gamma - Fs \cdot \text{sign}(\Omega) - d \cdot \sin(\theta + \varphi)$$

$$\frac{d\theta}{dt} = \Omega$$

In this system of equations, J is the moment of inertia of the whole system, f a coefficient of viscous frictions; Fs the Coulomb modulus of the dry frictions; d an unbalancing mass (d is zero in the case of a vertical axis); $\varphi$ the angle of the line connecting the centre of gravity of the payload to the axis with respect to the vertical.

In a multi-axis system, other forces may be applied in a non-linear manner such as, for example, the Coriolis forces.

The term $Fs \cdot \text{sign}(\Omega)$ modelling the dry frictions has a property of not being derivable around zero. In the identification step, in order to avoid the problems associated with this non-derivability, the reference during the test step is selected so that $\text{sign}(\Omega)$ is constant (for example positive). Under these conditions, the model described previously becomes:

$$J \frac{d\Omega}{dt} = -f \cdot \Omega + \Gamma - Fs - d \cdot \sin(\theta + \varphi)$$

$$\frac{d\theta}{dt} = \Omega$$

Parameters J and f of this second modelling are determined by identification using a non-linear programming algorithm such as the Levenberg-Marquardt algorithm for example.

Finally, the method ends with a step of synthesising an optimal controller for the payload effectively on-board. This controller is as performing as possible inasmuch as it possesses a slow regulation response time (while keeping sufficient static robustness margins-modulus margin- and/or robustness dynamic margins-delay margin).

Figure 7:
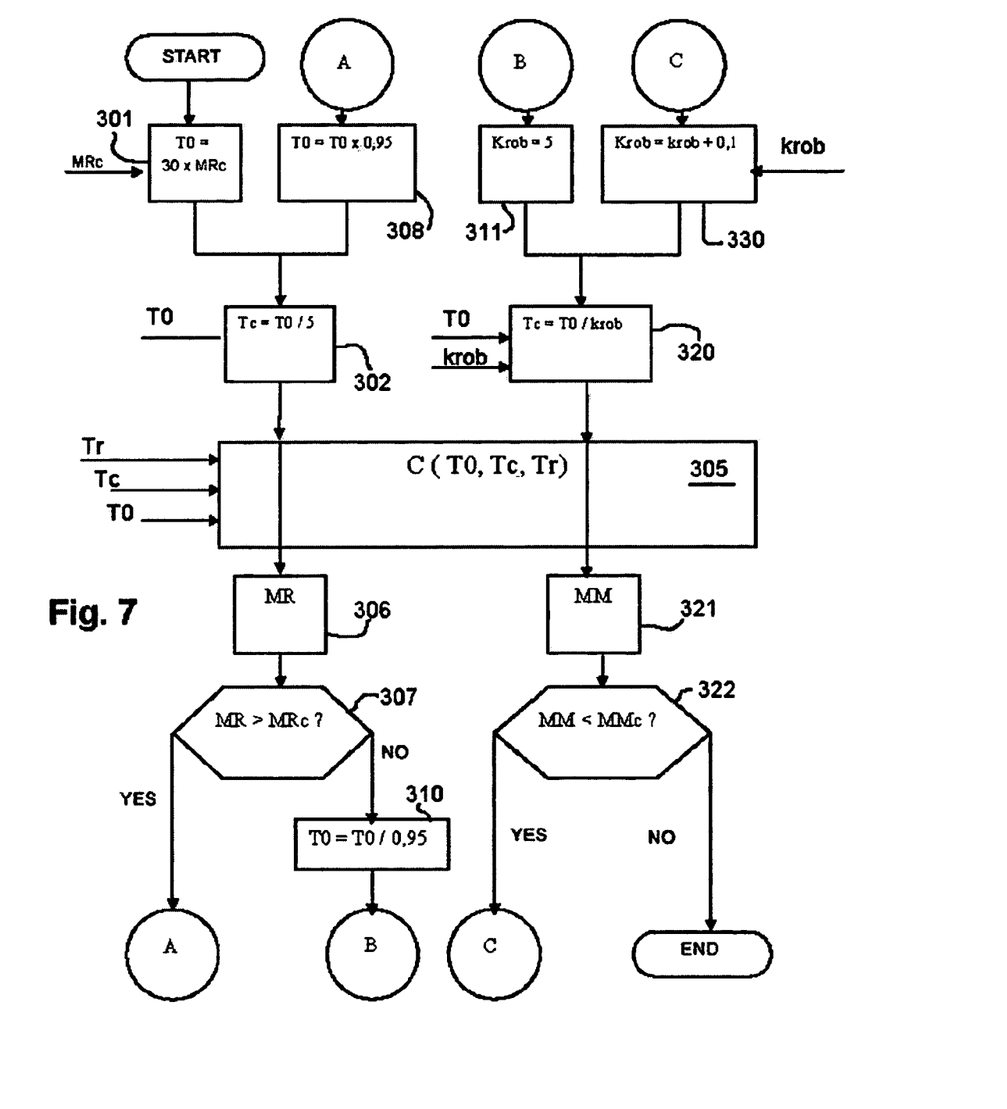
FIG. 7 is a diagram representing in the form of an algorithm, the determination step of the method according to the invention of an optimal controller relative to the payload.

As in the initial step, during the final step, the synthesis of the optimal corrector is performed according to the standard state control methodology by running the algorithm 300 of FIG. 7. The optimal controller is determined so that it meets the target delay margin MRc, the target modulus margin MMc and the adjustment parameter Tr. For this final step, the moment of inertia obtained by identification during the previous identification step is used.

Algorithm 300 starts with step 301 during which an enough high multiple of the current value of parameter MRc, for example 30×MRc, is set to the value of parameter To. The algorithm continues with step 302, during which the value of To is divided by five and the result is allocated to parameter Tc. Then, taking into account the current parameters To, Tr and Tc, step 305 enables to determine the corresponding controller by means of the standard state control methodology. It should be noted that step 305 is identical to step 205 of algorithm 200 (FIG. 4) with Ko set at the unit value. At output of step 305, step 306 is performed. It enables to calculate the delay margin MR of the obtained controller. At step 307, the value calculated for the delay margin MR is compared with the threshold delay margin MRc. If the delay margin MR is effectively greater than MRc, algorithm 300 goes back to step 308 following path A. At step 308, a new value for parameter To is calculated. The new value of To is lower than the previous value and is obtained by multiplying the previous value of To by a parameter smaller than the unit, in that instance 0.95 for example. Then step 302 is executed again. Taking into account the value of the new parameters, a new controller C is calculated at step 305. The loop is executed as long as condition 307 is true.

When MR is effectively smaller than the threshold value MRc, algorithm 300 goes out and step 310 is performed consisting simply in allocating the previous value to the value of parameter To used in the latest iteration of the loop. Thus, the current value of To is divided by 0.95 for example and the result is allocated as a new value of To.

Then algorithm 300 following path B is conducted to step 311. The second portion of algorithm 300 enables to determine the controller which will have the best suited modulus margin MM. At step 311, the variable Krob which is equal to the ratio of parameter To and parameter Tc takes, for example, the value 5. Then algorithm 300 continues towards step 320 wherein the values of parameter To and parameter Krob are read and the value of Tc is calculated by dividing To by Krob. Then step 305 is executed again, taking into account the current value of the different parameters. A controller C is determined. At step 321, the margin modulus MM of this new controller C is calculated. At step 322, the value of the modulus margin MM obtained is compared with the threshold modulus margin MMc. When the modulus margin MM is lower than MMc, algorithm 300 is directed towards step 330 by path C. At step 330 a new value is calculated for variable Krob, for example by incrementing Krob by a predetermined value 0.1 for example. Then the steps 320, 305, 321 are carried out again, taking into account the new values of the different parameters. Then, condition 322 is checked once more on the value of the modulus margin MM of the new controller C. The loop C takes place as long as the modulus margin MM remains lower than the threshold modulus margin MMc. As soon as condition 322 is not true, algorithm 300 ends. At that time, the algorithm 300 is ended.

An optimal controller relative to the payload currently arranged on the plate of the motion simulator has been obtained automatically. The method of obtaining such an optimal controller is reproducible and enables to obtain a result which is reliable and which is the best possible taking into account the values given to the adjustment parameters during the initial step. Implementation tests of the method according to the invention show that it is possible to define the parameters of the controller rapidly.

Although the invention has been described with reference to a particular embodiment, it is not limited to said embodiment in any ways. It encompasses all the technical equivalents of the means described as well as their combinations which fall within the scope of the invention.

More particularly, the method according to the invention applies to the case of motion simulators enabling the movement of the plate in rotation according to one or several axes, in translation according to one or several axes or the combination of rotation and translation. In a given particular case, the modelling of the mechanical section to be controlled and the measured positions to form the feedback control loop will be selected relative to such case. In particular in the case of a translation, the mass of the payload will be the inertia parameter to be considered, and it will not be the moment of inertia any longer, which is the inertia parameter specific to rotation.

The invention claimed is:

1. A tuning method to be implemented in a motion simulator able to embark a payload, said simulator including a mechanical device and a control unit, the mechanical device including driving means in order to move a plate capable of carrying the payload; a current amplifier capable of actuating the driving means in response to a control signal; a sensor capable of measuring a position of said plate; and said control unit including a controller capable of transmitting the control signal relative to a reference input signal and to said measured position,
    characterised in that it enables an automatic tuning of said controller for a position feedback control of the motion of said plate embarking a given payload, said method including:
    an initial step consisting in the synthesis of a robust controller, said synthesis being based on a first physical modelling of the mechanical device including one inertia parameter, said obtained robust controller enabling to feedback control said mechanical device over a range of values of said inertia parameter extending between a minimum inertia parameter and a maximum inertia parameter; and, after having positioned said given payload on the plate;
    a test step during which the mechanical device, controlled by means of said robust controller determined during the initial step is actuated according to a predefined position reference input profile complying with constraints on the acceleration, the speed and the position of the motion, said control signal and said measured position being stored continuously as data of the test step;
    an identification step which, on the basis of the data of the test step, enables to determine the value of a plurality of physical parameters of a second modelling of the mechanical device embarking said given payload, said plurality of physical parameters including at least the inertia parameter; and,
    a final step consisting in the synthesis of an optimal controller adapted to said given payload, wherein the inertia parameter takes the value of the inertia parameter determined during the identification step.

2. A method according to claim 1, characterised in that said mechanical device is able to translate said plate embarking a payload at least along one axis, the inertia parameter being then a mass of inertia.

3. A method according to claim 1, characterised in that said mechanical device is able to relate said plate embarking a payload at least around an axis, the inertia parameter being then a moment of inertia.

4. A method according to claim 1, characterised in that during the initial step, the controller is in a closed feedback control loop on a digital simulation of the mechanical device embarking a payload having a nominal inertia parameter in said range.

5. A method according to claim 1, characterised in that all the test, identification and final steps are carried out again at least each time the payload is changed.

6. A method according to claim 1, characterised in that, the first modelling is a linear modelling of the dynamic behaviour of the mechanical device.

7. A method according to claim 1, characterised in that said robust and optimal controllers include a Kalman filter based on said first modelling, said Kalman filter taking, as input, the control signal, said measured position and said position reference input to generate, as output, an estimated state of said mechanical device, said estimated state being applied as a control signal after having been multiplied by a vector.

8. A method according to claim 7, characterised in that said Kalman filter enables to estimate the disturbances affecting said mechanical device by modelling them by a signal added to the control signal at the input of the mechanical device to be controlled.

9. A method according to claim 1, characterised in that the synthesis of said robust and optimal controllers is preformed by means of a standard state control methodology.

10. A method according to claim 1, characterised in that the robust or optimal controllers include four high-level scalar tuning parameters.

11. A method according to claim 10, characterised in that said initial step comprises first of all, while varying a first scalar parameter among the scalar parameters, looking for a controller having a modulus margin greater than a threshold modulus margin for all the values of the moment of inertia of the range of moment of inertia, and then, while varying another scalar parameter among the scalar parameters, so-called the second parameter, looking for a controller having a delay margin greater than a threshold delay margin for all the values of the moment of inertia of the range of moment of inertia.

12. A method according to claim 10, characterised in that, the value of the moment of inertia having been identified, said final step comprises first of all, while varying the second parameter, looking for a controller having a delay margin greater than said threshold delay margin, and then, while varying still another scalar parameter among said four scalar parameters, so-called the third parameter, looking for an optimal controller having a modulus margin greater than said threshold modulus margin.

13. A method according to claim 10, characterised in that during the identification step, the second modelling is a linear modelling of the behaviour of the device.

14. A method according to claim 1, characterised in that, during the identification step, the second modelling takes into account explicitly the forces leading to a non linear behaviour of the device.

15. A method according to claim 1, characterised in that it includes, after completion of said test step, a pre-treatment step in order to reject the data for which the corresponding value of the speed of said plate is lower than a threshold speed.

16. A motion simulator capable of embarking a payload, said motion simulator including a mechanical device and a control unit, the simulator including a mobile plate capable of carrying said payload; driving means capable of putting the plate in motion according to at least one axis; a current amplifier capable of actuating the driving means in response to a control signal; a sensor capable of measuring a position of said plate; the control unit including a controller capable of transmitting the control signal relative to a reference input signal and said measured position, characterised in that the control unit is configured to implement the tuning method according to claim 1 to obtain an optimal corrector for a given payload.

17. A method according to claim 11, characterised in that, the value of the moment of inertia having been identified, said final step comprises first of all, while varying the second parameter, looking for a controller having a delay margin greater than said threshold delay margin, and then, while varying still another scalar parameter among said four scalar parameters, so-called the third parameter, looking for an optimal controller having a modulus margin greater than said threshold modulus margin.

* * * * *